Dec. 7, 1965
G. I. CHINN
3,221,762
REGULATING VALVE
Filed May 14, 1962
2 Sheets-Sheet 1
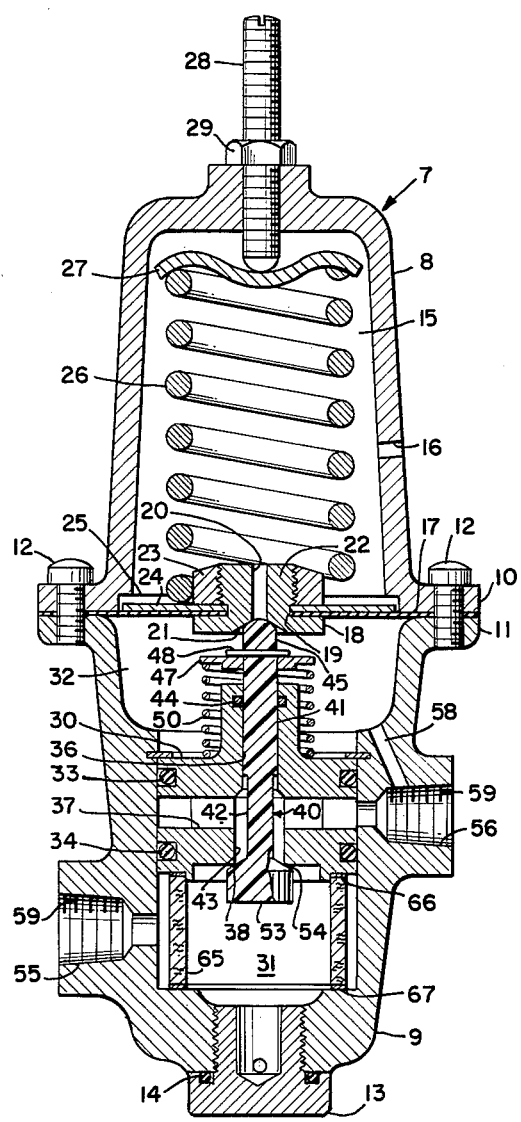
FIG. 1
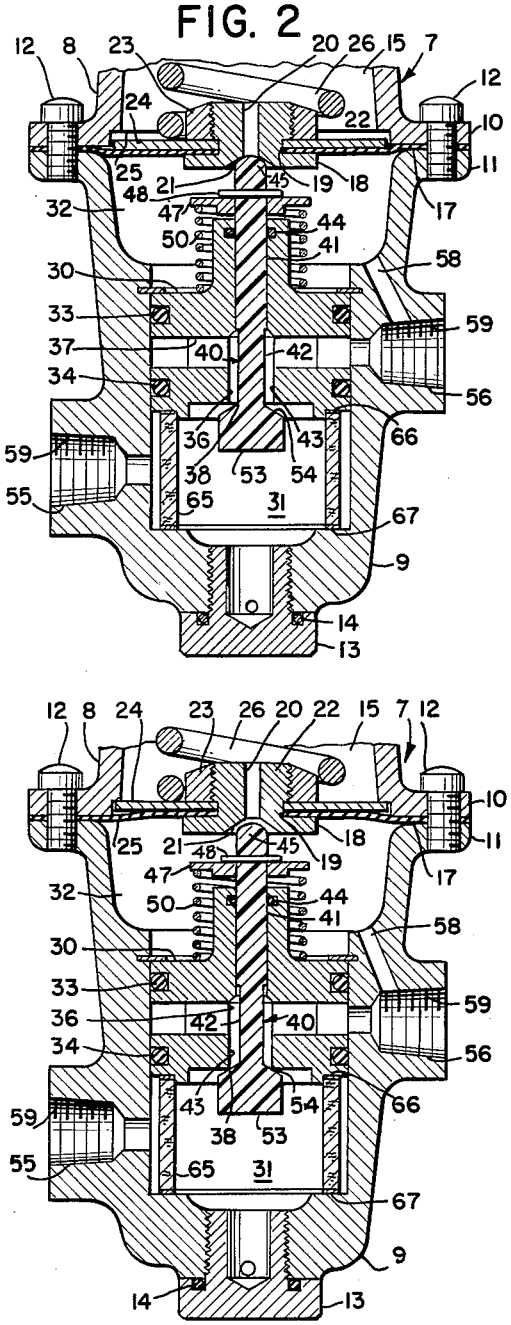
FIG. 2
FIG. 3

United States Patent Office 3,221,762
Patented Dec. 7, 1965

3,221,762
REGULATING VALVE
George I. Chinn, Middletown, N.Y., assignor to Kieley and Mueller, Inc., Middletown, N.Y., a corporation of New York
Filed May 14, 1962, Ser. No. 194,319
17 Claims. (Cl. 137—116.5)

This invention relates to valves and more particularly to regulating valves for controlling the flow of fluid under pressure.

Valves of the type to which the present invention is directed, while of general application, are particularly well suited for use as pressure regulators to provide a source of fluid under constant pressure. Such valves illustratively may be employed in a pneumatic control system, for example, to supply gaseous fluid at predetermined pressures to the various operating elements of the system.

Heretofore, regulating valves for controlling the flow of fluid under pressure have exhibited certain disadvantages. For example, difficulties frequently were encountered in insuring the detection of rapid changes in the outlet pressure of the valve and in the immediate restoration thereof to its initial value without damaging or otherwise adversely affecting the various valve components. In addition, in many such previous valves, excessive fluid leakage occurred with the result that the actual outlet pressure was not the same as the predetermined pressure. Furthermore, regulating valves of the type used heretofore frequently proved deficient in the rapid and straightforward adjustment of the outlet pressure over a sufficiently wide range.

One general object of this invention, therefore, is to provide a new and improved regulating valve for controlling the flow of fluid under pressure.

More specifically, it is an object of this invention to provide a regulating valve of the character indicated in which the immediate restoration of the outlet pressure to a predetermined value in response to rapid variations thereof is effected without adversely affecting the valve components.

Another object of this invention is to provide such a regulating valve in which the deleterious effects of leakage are substantially reduced.

Still another object of the invention is to provide a new and improved regulating valve, utilizing comparatively simple mechanical components, which is economical to manufacture and thoroughly reliable in operation.

In one illustrative embodiment of this invention, there is provided a regulating valve which includes a valve housing having an inlet port supplied with fluid under pressure and an outlet port. The housing encloses an inlet chamber connected to the inlet port, an intermediate chamber connected to the outlet port and an exhaust chamber open to the atmosphere. A flexible diaphragm is supported within the housing between the intermediate chamber and the exhaust chamber, and the diaphragm carries a seat element which includes an exhaust passage interconnecting these chambers. Mounted in spaced relationship with the diaphragm is a stationary valve member. The valve member separates the inlet chamber and the intermediate chamber and is provided with a valve seat and a passage therethrough which accommodates an elongated valve stem or poppet. The valve stem is reciprocally movable relative to the valve member and includes end portions which respectively cooperate with the seat element on the diaphragm and the valve seat on the valve member. A relatively strong coil spring urges the diaphragm and its seat element toward the valve stem, to maintain the seat element in contact with the corresponding stem end portion and thereby block the exhaust passage. A somewhat weaker spring biases the stem toward the diaphragm.

The fluid at the inlet port is transmitted through the valve and appears at the outlet port under constant, predetermined pressure. Should the outlet port pressure increase, for example, and hence raise the pressure in the intermediate chamber, the diaphragm and its seat element move away from the adjacent end portion of the valve stem against the compression in the diaphragm spring, thereby opening the exhaust passage and permitting the flow of fluid from the outlet port and the connected intermediate chamber to the exhaust chamber. Simultaneously, the comparatively weaker spring acting on the valve stem urges the opposite end portion thereof into engagement with the valve seat on the valve member and prevents the further transmission of fluid to the outlet port. Upon the return of the outlet port pressure to its initial level, the diaphragm spring moves the seat element into contact with the valve stem, to close the exhaust passage, and the stem moves relative to the valve member to again permit fluid flow to the outlet port.

In cases in which there is a decrease in the outlet port pressure, the pressure in the intermediate chamber is likewise reduced, and the diaphragm spring urges the diaphragm, its seat element and the valve stem in engagement therewith in a direction to increase the spacing between the valve seat and the adjacent end portion of the stem. Additional fluid is thereupon applied from the inlet port to the outlet port until the outlet port pressure again reaches its predetermined value.

In accordance with one feature of this invention, in certain particularly advantageous embodiments, the valve stem is of integral, unitary construction and is fabricated from a plastic material, such as nylon, for example. The seat element on the diaphragm and the valve seat on the valve member, on the other hand, are of metal or other relatively hard material. With this arrangement, as the valve stem reciprocates in response to pressure variations, the movement of the stem end portions is cushioned as they engage their corresponding seats. As a result, the adverse effects of wear, etc. are substantially reduced, and the end portions provide a fluid-tight seal when in engagement with the seats.

In accordance with another feature of the invention, in certain good arrangements, the valve stem serves to block the flow of fluid between the inlet chamber and the intermediate chamber at all times. A portion of the valve stem is of reduced diameter, and the valve member passage in which the stem reciprocates communicates with a second passage leading directly to the outlet port. The arrangement is such that, upon the movement of the stem end portion away from the seat on the valve member, fluid flows directly from the inlet chamber to the outlet port without passing through the intermediate chamber. Thus, the pressure in the intermediate chamber, and hence the pressure acting on the diaphragm, is determined primarily by the pressure at the outlet port and is unaffected by the pressure in the inlet chamber, with the result that the apparatus is immediately responsive to changes in the outlet port pressure.

In accordance with a further feature of the invention, in some embodiments, the tension in the diaphragm spring is readily adjustable in a rapid and straightforward manner to vary the predetermined outlet port pressure through a wide range.

The above noted as well as further objects and features of the invention will be understood more clearly and fully from the following detailed description of a preferred embodiment thereof, when read with reference to the accompanying drawings, in which:

FIGURE 1 is a vertical sectional view of a pressure regulator constructed in accordance with one illustrative embodiment of the invention;

FIGURE 2 is a fragmentary sectional view similar to a portion of FIGURE 1 but showing certain parts in different positions;

FIGURE 3 is a fragmentary sectional view similar to FIGURE 2 but showing certain parts in still other positions.

Figure 4:
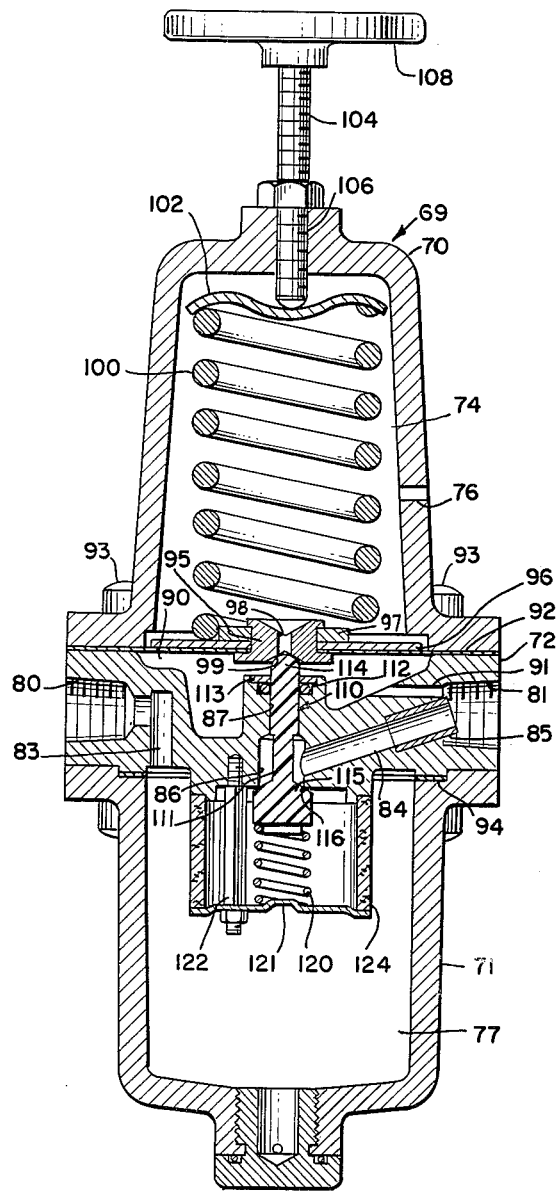
FIGURE 4 is a vertical sectional view of a pressure regulator constructed in accordance with another illustrative embodiment of the invention.

Referring to FIGURE 1 of the drawings, there is shown an elongated, substantially hollow valve housing 7 which is formed from two cup-shaped sections 8 and 9 of aluminum or other suitable material. The open ends of the sections 8 and 9 include annular flanges 10 and 11, respectively, which are maintained in fluid-tight relationship with each other by bolts 12. The lowermost section 9 is provided with a removable drain plug 13 which is surrounded by an O-ring 14 to prevent leakage.

The housing section 8 encloses an exhaust chamber 15 which is suitably connected to the atmosphere, as by a vent opening 16, and is separated from the housing section 9 by a disc-shaped wall or diaphragm 17. The periphery of the diaphragm 17 is rigidly secured between the flanges 10 and 11 by the bolts 12. The diaphragm is fabricated from rubber or other suitable flexible material to enable movement of the center portion thereof in response to pressure changes within the housing. A metallic button 18 is mounted on the diaphragm in a centrally located aperture 19. This button includes an axial exhaust passage 20 therethrough which interconnects the chamber 15 and the housing section 9. The button 18 forms a valve seat 21 at the end of the passage 20 adjacent section 9. To firmly secure the button to the diaphragm, the button is provided with an upstanding threaded portion 22 which extends through the diaphragm aperture 19 and accommodates a nut 23 on the side of the diaphragm adjacent the chamber 15. A thrust washer 24 is interposed between the nut 23 and the diaphragm, and the peripheral edge of this washer is disposed in an enlarged annular groove 25 in the inner surface of the section 8.

An elongated coil spring 26 is axially positioned within the housing section 8. One end of the spring 26 engages the thrust washer 24 adjacent the nut 23, while the other end abuts a substantially circular guide member 27 near the closed end of the section 8. The axial position of this guide member is adjustable by means of an adjusting screw 28 to vary the degree of compression in the spring. The screw 28 protrudes through a mating aperture in the closed end of section 8 and is held in place by a lock nut 29.

A substantially cylindrical valve body 30 of aluminum or other metallic material is rigidly mounted intermediate the ends of the housing section 9. The valve body 30 separates the section 9 into an inlet chamber 31 and an intermediate chamber 32 and is provided with two O-rings 33 and 34 around its periphery to prevent fluid leakage therebetween. The body 30 includes a first, axially located passage 36 and a second passage 37 which extends in a diametrical direction and meets the passage 36 at a right angle. The portion of the body 30 forming the lower end of passage 36 defines a valve seat 38.

Reciprocally mounted in the axial passage 36 of the valve body 30 is an elongated cylindrical valve stem or poppet 40 which advantageously is fabricated from a relatively soft material, such as nylon or other suitable plastic, for example. One portion 41 of the poppet 40 is located between the valve body passage 37 and the intermediate chamber 32 and is of a diameter substantially equal to the diameter of the adjacent part of the passage 36. Another portion 42 of the poppet is disposed on the side of the passage 37 adjacent the inlet chamber 31 and is of reduced diameter, for purposes that will become more fully apparent hereafter. This reduced portion is substantially coextensive with an enlarged portion 43 of the passage 36. An O-ring 44 is disposed between the poppet portion 41 and the valve body 30 to prevent the direct flow of fluid between the inlet chamber 31 and the intermediate chamber 32 at all times.

One end of the poppet 40 protrudes from the valve body 30 into the intermediate chamber 32 and forms a valve element 45 which is located immediately adjacent the valve seat 21 on the diaphragm button 18. An annular washer 47 surrounds this end of the poppet and is prevented from moving relative thereto toward the seat 21 by a transversely extending cotter pin 48. A relatively light coil spring 50 is interposed between the washer 47 and the valve body 30 to bias the poppet toward the seat 21.

The end of the poppet 40 opposite that including the valve element 45 protrudes into the inlet chamber 31 and is enlarged to form a second valve element 53. This latter valve element is positioned in juxtaposition with the seat 38 on the valve body 30 and includes a conical surface 54 thereon which is arranged to engage the seat 38 to alternately open and close the axial passage 36.

The regulator is provided with an inlet port 55 and an outlet port 56 which are formed in the housing section 9 and respectively communicate with the inlet chamber 31 and the passage 37 in the valve body 30. The outlet port 56 additionally communicates with the intermediate chamber 32 through a passage 58 in the portion of housing section 9 therebetween. The ports 55 and 56 are each provided with internal threads 59, and the axes of the ports extend from opposite sides of section 9 in substantially parallel relationship with each other to facilitate the connection of external pressure conduits (not shown) thereto.

In the absence of fluid pressure at the inlet port 55 and the outlet port 56, the elongated coil spring 26 maintains the diaphragm button 18 in engagement with the valve element 45 on the poppet 40, thereby blocking the exhaust passage 20. The force exerted on the button 18 by the coil spring 26 is substantially greater than that exerted by the coil spring 50, and this latter spring is compressed between the washer 47 and the valve body 30. As best shown in FIGURE 2, the poppet valve element 53 is spaced from the valve seat 38 to permit fluid flow between the inlet chamber 31 and the passage 36.

The pressurized fluid to be regulated is introduced into the chamber 31 through the inlet port 55. To filter the incoming fluid, the chamber 31 is provided with a cylindrical filter 65. This filter includes two annular gaskets 66 and 67 at opposite ends thereof which respectively engage the valve body 30 and the closed inner end of the housing section 9. The fluid flows from the chamber 31 into the open passage 36 in the valve body. As indicated above, the portion 43 of this passage is enlarged and is substantially coextensive with the reduced portion 42 of the poppet 40. The fluid passes between the portion 42 and the surrounding wall of passage 36 to the passage 37 leading to the outlet port 56. The O-ring 44 around the poppet portion 41 serves to prevent the flow of fluid through the passage 36 to the intermediate chamber 32.

The pressure of the fluid at the outlet port 56 is transmitted through the passage 58 to the intermediate chamber 32. As the pressure in the chamber 32 builds up and balances the compression in the coil spring 26, the diaphragm 17 moves to its substantially flat (FIGURE 1) position. During this movement, the coil spring 50 maintains the valve element 45 in engament with the seat 21 and urges the valve element 53 against the seat 38, thereby closing the passage 36.

Shoud the pressure at the outlet port 56 decrease, a corresponding decrease in pressure is transmitted through the passage 58 to the intermediate chamber 32. The coil spring 26 thereupon acts on the thrust washer 24 to flex the diaphragm 17 and move the button 18 and the poppet 40 toward the positions shown in FIGURE 2. During this movement, the button moves the poppet toward the inlet chamber 31 against the compression in the coil spring 50 to thereby open the passage 36. Fluid from the inlet chamber 31 is admitted through this passage and into the passage 37 leading to the outlet port 56 in a manner similar to that described heretofore, thereby raising the outlet port pressure to its initial level. As the pressure is restored, equilibrium is established on opposite sides of the diaphragm 17, and the diaphragm returns to its substantially flat (FIGURE 1) position. During this return movement, the spring 50 maintains the end element 45 of the poppet 40 in engagement with the value seat 21, and the opposite end element 53 closes the passage 36 to arrest the flow of fluid therethrough.

In cases in which the pressure at the outlet port 56 increases above the desired outlet pressure, the regulator immediately returns the pressure to its initial level. Thus, as best shown in FIGURE 3, the pressure increase at the outlet port is transmitted through the passage 58 to the intermediate chamber 32, thereby flexing the diaphragm 17 to move the button 18 toward the exhaust chamber 15 against the compression in the coil spring 26. During this movement, the button is separated from the end element 45 of the poppet 40, thus opening the exhaust passage 20. The fluid in the chamber 32 is discharged through passage 20 into the exhaust chamber 15 until the pressure in the chamber 32, and hence that at the outlet port 56, is reduced to the desired outlet pressure. The diaphragm 17 thereupon returns to its initial (FIGURE 1) position to move the button 18 into engagement with the element 45 and thereby close the exhaust passage 20.

As indicated heretofore, the valve seat 21 on the button 18 and the valve seat 38 on the body 30 are each fabricated from a metallic or other relatively hard material. The poppet 40, on the other hand, is made from a comparatively soft material such as nylon. With this arrangement, the movement of the poppet end elements 45 and 53 is cushioned as they engage their corresponding valve seats 21 and 38. In addition, any leakage through the passages 20 and 36 during the time the elements 45 and 53 are in contact with their seats is maintained at a minimum, and an extremely uniform outlet pressure appears at the port 56.

The screw 28 is readily adjustable to vary the predetermined pressure at the outlet port 56 over a wide range. To raise the outlet port pressure, for example, the screw 28 is rotated in a direction to further compress the coil spring 26 and thereby increase the bias on the diaphragm 17. The increased compression in the spring requires a higher pressure at the intermediate chamber 32, and hence at the outlet port, before the diaphragm flexes sufficiently to close the passage 36. In cases in which a lower outlet port pressure is desired, the screw 28 is rotated in the opposite direction to reduce the bias on the diaphragm 17, with the result that less pressure is required at the intermediate chamber to close passage 36.

In the embodiment illustrated in FIGURES 1 through 3, the inlet port 55 is oriented along an axis which is parallel to but spaced from the axis of the outlet port 56. The ports 55 and 56 are oppositely disposed and are arranged to be connected to oppositely extending pressure conduits (not shown) which likewise are in spaced, parallel relationship with each other.

In other good arrangements, particularly in cases in which the inlet and outlet ports are to be connected to external pressure conduits in axial alignment with each other, the ports are located along a common axis. One particularly advantageous embodiment in accordance with these latter arrangements is shown in FIGURE 4 and comprises a pressure regulator which includes an elongated housing 69 having two cup-shaped sections 70 and 71 and an intermediate section 72 interposed therebetween.

The section 70 encloses an exhaust chamber 74 which is connected to the atmosphere by a vent opening 76, while the section 71 encloses an inlet chamber 77.

The intermediate section 72 is provided with an inlet port 80 and an outlet port 81 which are oppositely disposed along a common axis. A passage 83 in the section 72 extends in a direction parallel to the longitudinal axis of the housing 69 and connects the inlet port 80 with the inlet chamber 77. A second passage 84 in section 72 communicates with the outlet port 81 and is provided with a nozzle 85 at the end thereof adjacent the outlet port. The passage 84 serves to connect the port 81 with the enlarged portion 86 of an axially located passage 87. This latter passage extends through the section 72 from the inlet chamber 77 to an intermediate chamber 90 which is formed in the hollowed-out upper surface of section 72. A passage 91 interconnects the intermediate chamber and the port 81.

The intermediate chamber 90 is separated from the exhaust chamber 74 by a flexible diaphragm 92. The diaphragm 92 is positioned between the housing sections 70 and 72, and the sections 70 and 72 and the diaphragm are maintained in fixed relationship with each other and with the housing section 71 by a series of peripherally located screws 93. The diaphragm maintains a fluid-tight seal between the sections 70 and 72, while an annular gasket 94 prevents leakage between the section 72 and the section 71.

An aluminum button 95 and a thrust washer 96 are located on the diaphragm 92 in a manner similar to that described heretofore in connection with the button 18 and the thrust washer 24 (FIGURES 1-3). A second washer 97 surrounds the portion of the button 95 which protrudes into the exhaust chamber 74 and serves to maintain the thrust washer 96 in contact with the adjacent surface of the diaphragm. The button 95 is provided with an axial exhaust passage 98 inter-connecting the exhaust chamber and the intermediate chamber 90, and the button forms a valve seat 99 at the intermediate chamber end of this passage.

Mounted in the exhaust chamber 74 within the housing section 70 is a precompressed coil spring 100. One end of the spring 100 bears against the thrust washer 96 to bias the washer, the diaphragm 92 and the button 95 toward the intermediate chamber 90. The opposite end of the spring engages a substantially circular guide member 102 adjacent the closed end of the section 70. An adjusting screw 104 abuts the member 102 and protrudes through a threaded aperture 106 in section 70. The screw 104 is provided with a handle 108 at its protruding end which is rotatable to vary the compression in the spring 100 and thereby adjust the bias on the diaphragm.

The portion of the intermediate section 72 within the housing 69 is spaced from the diaphragm 92 and serves as a valve member in a manner similar to the valve body 30 (FIGURES 1-3) described heretofore. An elongated valve stem or poppet 110 is reciprocally supported in the axial passage 87 of the section 72. This poppet is fabricated from nylon or other relatively soft material and is somewhat shorter than the poppet 40. The poppet 110 includes a centrally located portion 111 of reduced diameter which is disposed adjacent the enlarged portion 86 of the passage 87. To prevent fluid flow from the portion 86 to the intermediate chamber 90 for all positions of the poppet, the passage 86 is provided with an O-ring 112 which is held in place by a retaining washer 113.

One end of the poppet 110 protrudes into the intermediate chamber 90 and forms a valve element 114 adjacent the seat 99 and the diaphragm button 95. The opposite end of the poppet 110 extends into the inlet chamber 77 and is enlarged to form a valve element 115. The valve element 115 is positioned in juxtaposition with a mating seat 116 on the portion of the housing section 72 which surrounds the adjacent end of the passage 87.

The button 95 and the section 72 are of metallic material, with the result that the seats 99 and 116 are relatively hard when compared with the nylon poppet 110. With this arrangement, the movement of the elements 114 and 115 is cushioned as they engage their respective seats during the reciprocation of the poppet.

The poppet 110 is supported by a relatively light coil spring 120 which is located within the inlet chamber 77. The spring 120 is interposed between the end of the poppet adjacent the valve element 115 and a stationary plate 121 therebeneath. This plate is mounted in spaced relationship with the housing section 72 and is separated therefrom by two studs 122 (only one of the studs 122 being visible in FIGURE 4). The plate 121 carries a cylindrical filter 124 which is positioned between the plate and the section 72 in axial alignment with the passage 87.

Upon the application of fluid under pressure to the inlet port 80, the fluid flows through the passage 83 and into the inlet chamber 77. The compression in the coil spring 100 maintains the seat 99 in contact with the valve element 114 on the poppet 110, to close the exhaust passage 98, and holds the valve element 115 away from its seat 116. The incoming fluid passes into the enlarged portion 86 of the passage 87 and through the connected passage 84 and the nozzle 85 to the outlet port 81. The fluid pressure at the outlet port is transmitted through the passage 91 to the intermediate chamber 90 and acts on the diaphragm 92 to balance the compression in the spring 100. The spring 120 thereupon moves the poppet 110 in a direction to close the passage 87.

The poppet 110 reciprocates within the axial passage 87 in a manner similar to that described above in connection with the embodiment of FIGURES 1-3 to maintain a constant pressure at the outlet port 81. Thus, should the outlet port pressure decrease, for example, the pressure in the intermediate chamber 90 also is reduced to enable the compressive forces in the coil spring 100 to move the diaphragm button 95 and the poppet 110 toward the inlet chamber 77. The valve element 115 on the poppet is urged away from its seat 116 to open the passage 87 and thereby admit additional fluid to the outlet port 81 until the outlet port pressure is restored to its initial level. In cases in which the outlet port pressure increases, the resulting pressure increase in the intermediate chamber moves the button 95 away from the valve element 114 against the compression in the spring 100, to open the exhaust passage 98, and the spring 120 acts on the valve element 115 to close the passage 87.

The terms and expressions which have been employed are used as terms of description and not of limitation, and there is no intention, in the use of such terms and expressions, of excluding any equivalents of the features shown and described, or portions thereof, it being recognized that various modifications are possible within the scope of the invention claimed.

What is claimed is:

1. A pressure regulator comprising, in combination, a housing having an inlet port supplied with fluid under pressure and an outlet port, means mounted within said housing and including a movable wall having an exhaust passage therein, said wall being subjected to the pressure at said outlet port, a valve member supported within said housing in spaced relationship with said wall, said valve member including a first passage having an enlarged portion open to said inlet port and a second passage connecting said first passage to said outlet port to enable the transmission of fluid thereto, an elongated, integrally formed valve element of relatively soft material movably carried by said valve member and having a first end portion for closing said first passage and a second end portion for closing said exhaust passage, means for moving said wall and said valve element in one direction relative to said valve member in response to a decrease in the fluid pressure at said outlet port, to urge said first end portion away from said first passage and thereby raise the outlet port pressure, said wall moving in another direction relative to said valve member and said valve element in response to an increase in the pressure at said outlet port, to open said exhaust passage and thereby reduce the outlet port pressure, and means for blocking the transmission of fluid between the enlarged portion of said first passage and the space between said wall and said valve member for all positions of said valve element.

2. A pressure regulator comprising, in combination, a housing having an inlet port supplied with fluid under pressure and an outlet port, means mounted within said housing and including a movable wall having an exhaust passage therein, a stationary valve member supported within said housing in spaced relationship with said wall, said valve member including a first passage having an enlarged portion open to said inlet port and a second passage connecting said first passage to said outlet port to enable the transmission of fluid thereto, means for supplying the pressure at said outlet port to the space between said wall and said valve member, an elongated, integrally formed valve element of synthetic material reciprocally mounted within said first passage and having a first end portion for closing said first passage and a second end portion for closing said exhaust passage, said valve element blocking the transmission of fluid from the enlarged portion of said first passage to said space for all positions thereof, and means for moving said wall and said valve element in one direction relative to said valve member in response to a decrease in the fluid pressure at said outlet port, to urge said first end portion away from said first passage and thereby raise the outlet port pressure, said wall moving in another direction relative to said valve member and said valve element in response to an increase in the pressure at said outlet port, to open said exhaust passage and thereby reduce the outlet port pressure.

3. A pressure regulator comprising, in combination, a housing having an inlet port supplied with fluid under pressure and an outlet port, means including a movable wall within said housing, said last-mentioned means having a first seat portion and including an exhaust passage therein, a stationary valve member supported within said housing in spaced relationship with said wall and having a first passage open to said inlet port and a second passage connecting said first passage to said outlet port to enable the transmission of fluid thereto, said valve member including a second seat portion adjacent said first passage, means for supplying the pressure at said outlet port to the space between said wall and said valve member, an elongated, integrally formed vave element of relatively soft synthetic material movably carried by said valve member, one end of said valve element being disposed adjacent said second seat portion to close said first passage in response to an increase in pressure at said outlet port, the other end of said element being disposed in engagement with said first seat portion to close said exhaust passage, said pressure increase at said outlet port moving said wall and said first seat portion relative to said valve member and said valve element in a direction to open said exhaust passage and thereby reduce the outlet port pressure, and means responsive to a decrease in pressure at said outlet port for urging said wall and said valve element relative to said valve member in a direction to move said one end of said valve element away from said second seat portion, to thereby raise the outlet port pressure.

4. A pressure regulator comprising, in combination, a housing having an inlet port supplied with fluid under pressure and an outlet port, wall means movably supported within said housing and including a first metallic valve seat having an exhaust passage therein, a valve member mounted within said housing in spaced relationship with said wall means and having a first passage open to said inlet port and a second passage connecting said first passage to said outlet port to enable the transmission of fluid thereto, said valve member including a second metallic valve seat adjacent said first passage, means for supplying the pressure at said outlet port to the space between said wall means and said valve member, an elongated plastic valve element of integrally formed unitary construction movably carried by said valve member and including a pair of end portions, one of said end portions being disposed adjacent said second valve seat to close said first passage in response to an increase in pressure at said outlet port, the other of said end portions being disposed in engagement with said first valve seat to close said exhaust passage, said pressure increase at said outlet port urging said wall means and said first valve seat away from the other end portion of said valve element, to open said exhaust passage and thereby reduce the outlet port pressure, and means responsive to a decrease in pressure at said outlet port for moving said wall means, said first valve seat and said valve element in a direction to urge said one end portion away from said second valve seat, to thereby raise the outlet port pressure.

5. A pressure regulator comprising, in combination, a housing having an inlet port supplied with fluid under pressure and an outlet port, wall means movably supported within said housing and including a first metallic valve seat having an exhaust passage therein, said wall means being subjected to the pressure at said outlet port, a stationary valve member mounted within said housing in spaced relationship with said wall means and having a first passage open to said inlet port and a second passage connecting said first passage to said outlet port to enable the transmission of fluid thereto, said valve member including a second metallic valve seat adjacent said first passage, an elongated plastic valve element of integrally formed unitary construction reciprocally carried by said valve member and including a pair of end portions, one of said end portions being disposed adjacent said second valve seat to close said first passage in response to an increase in pressure at said outlet port, the other of said end portions being disposed in engagement with said first valve seat to close said exhaust passage, said pressure increase at said outlet port urging said wall means and said first valve seat away from said other end portion, to open said exhaust passage and thereby reduce the outlet port pressure, spring means responsive to a decrease in pressure, at said outlet port for moving said wall means and said valve element in a direction to urge said one end portion away from said second valve seat, to open said first passage and thereby raise the outlet port pressure, and means for blocking the transmission of fluid between said first passage and the space between said wall means and said valve member for all positions of said valve element.

6. A pressure regulator comprising, in combination, a housing having an inlet port supplied with fluid under pressure and an outlet port, means including a movable wall within said housing, said last-mentioned means having a first metallic valve seat and including an exhaust passage therein, a stationary valve member supported within said housing in spaced relationship with said wall and having a first passage open to said inlet port and a second passage connecting said first passage to said outlet port to enable the transmission of fluid thereto, said valve member including a second metallic valve seat adjacent said first passage, means for supplying the pressure at said outlet port to the space between said wall and said valve member, an elongated, integrally formed valve element of plastic material reciprocally mounted within said first passage, one end of said valve element being disposed adjacent said second valve seat to close said first passage in response to an increase in pressure at said outlet port and the other end being disposed in engagement with said first valve seat to close said exhaust passage, said valve element blocking the transmission of fluid through said first passage from said inlet port to said space for all positions thereof, said pressure increase at said outlet port urging said movable wall and said first valve seat away from said other end portion, to open said exhaust passage and thereby reduce the outlet port pressure, and means responsive to a decrease in pressure at said outlet port for moving said wall, said first valve seat and said valve element in a direction to urge said one end portion away from said second valve seat, to thereby raise the outlet port pressure.

7. A pressure regulator comprising, in combination, a housing having an inlet port supplied with fluid under pressure and an outlet port, wall means movably supported within said housing and including a first metallic valve seat having an exhaust passage therein, a stationary valve member mounted within said housing in spaced relationship with said wall means, said valve member including a first passage interconnecting said inlet port and the space between said wall means and said valve member and a second passage connecting said first passage to said outlet port, said valve member having a second metallic valve seat adjacent said first passage, means for supplying the pressure at said outlet port to said space, an elongated, integrally formed valve element of plastic material reciprocally supported within said first passage, one end of said valve element being disposed adjacent said second valve seat to close said first passage in response to an increase in pressure at said outlet port and the other end being disposed in engagement with said first valve seat to close said exhaust passage, said valve element blocking the transmission of fluid through said first passage from said inlet port to said space for all positions thereof, said pressure increase at said outlet port urging said wall means and said first valve seat away from said other end portion, to open said exhaust passage and thereby reduce the outlet port pressure, and spring means responsive to a decrease in pressure at said outlet port for moving said wall means, said first valve seat and said valve element relative to said valve member in a direction to maintain the other end of said valve element in engagement with said first seat and to urge said one end away from said second seat, to thereby raise the outlet port pressure.

8. A pressure regulator comprising, in combination, a housing having a plurality of pressure chambers therein, a stationary valve member supported within said housing between said chambers, said valve member including a first passage interconnecting said chambers and a second passage in open communication with said first passage, means including a movable wall defining a portion of one of said chambers and having an exhaust passage therein open to the atmosphere, means forming an inlet port supplied with fluid under pressure and communicating with the other of said chambers, said first passage having an enlarged portion interconnecting said other chamber and said second passage, means forming an outlet port in open communication with the second passage of said valve member and with said one chamber, an elongated, integrally formed valve element of synthetic material movably supported in the first passage of said valve member and including a first end portion for closing said first passage and a second end portion for closing said exhaust passage, said valve element blocking communication between said chambers from the enlarged portion of said first passage to said one chamber for all positions thereof, and means cooperating with said movable wall for biasing the same into engagement with said second end portion to close said exhaust passage, said last-mentioned means urging said wall and said valve element in a direction to move said first end portion away from said first passage in response to a decrease in pressure at said outlet port, an increase in pressure at said outlet port urging said movable wal away from said second end portion to open said exhaust passage.

9. A pressure regulator comprising, in combination, a housing having an inlet port supplied with fluid under pressure and an outlet port, means including a movable wall within said housing, said last-mentioned means having a first metallic valve seat and including an exhaust passage therein, a stationary valve member supported within said housing in spaced relationship with said wall, said valve member having a first passage interconnecting said inlet port and the space between said wall and said valve member and a second passage connecting said first passage to said outlet port, said valve member including a second metallic valve seat adjacent said first passage, means for supplying the pressure at said outlet port to said space, an elongated, integrally formed valve element of plastic material reciprocally supported within said first passage, one end of said valve member being disposed adjacent said second valve seat to close said first passage in response to an increase in pressure at said outlet port and the other end being disposed in engagement with said first valve seat to close said exhaust passage, said valve element blocking the transmission of fluid through said first passage from said inlet port to said space for all positions thereof, said pressure increase at said outlet port urging said movable wall and said first valve set away from said other end portion, to open said exhaust passage and thereby reduce the outlet port pressure, first spring means responsive to said pressure increase for maintaining said one end in engagement with said second valve seat, to close said first passage, and second spring means responsive to a decrease in pressure at said outlet port for moving said wall, said first valve seat and said valve element relative to said valve member in a direction to maintain said other end in engagement with said first valve seat and to urge said one end away from said second valve seat, to thereby raise the outlet port pressure.

10. A pressure regulator comprising, in combination, a housing having a plurality of pressure chambers therein, valve means interposed between said chambers and including a first passage interconnecting said chambers and a second passage in open communication with said first passage, means including a movable wall defining a portion of one of said chambers and having an exhaust passage therein open to the atmosphere, means forming an inlet port supplied with fluid under pressure and communicating with the other of said chambers, means forming an outlet port in open communication with the second passage of said valve member and with said one chamber, an elongated, integrally formed valve element of relatively soft material movably supported in the first passage of said valve means and including a first end portion for closing said first passage and a second end portion for closing said exhaust passage, means for blocking communication between said chambers through said first passage for all positions thereof, first spring means cooperating with said valve element for biasing the first end portion thereof into engagement with said valve means to close said first passage, and second spring means cooperating with said movable wall for biasing the same into engagement with said second end portion to close said exhaust passage, said second spring means urging said wall and said valve element in a direction to move said first end portion away from said first passage in response to a decrease in pressure at said outlet port, an increase in pressure at said outlet port urging said movable wall away from said second end portion to open said exhaust passage and enable said first spring means to close said first passage.

11. A pressure regulator comprising, in combination, a housing having an inlet chamber, an intermediate chamber and an exhaust chamber, a valve member supported within said housing between said inlet chamber and said intermediate chamber, said valve member including a first passage interconnecting said inlet chamber and said intermediate chamber and a second passage, said first passage having an enlarged portion interconnecting said inlet chamber and said second passage, means including a movable wall within said housing between said intermediate chamber and said exhaust chamber, said last-mentioned means having an exhaust passage interconnecting said intermediate chamber and said exhaust chamber, means defining an inlet port supplied with fluid under pressure and comunicating with said inlet chamber, means defining an outlet port in open communication with the second passage of said valve member and with said intermediate chamber, an elongated, integrally formed valve element of plastic material movably mounted in the first passage of said valve member and including a first end portion for closing said first passage and a second end portion for closing said exhaust passage, said valve element blocking communication from the enlarged portion of said first passage to said intermediate chamber for all positions thereof, and spring means cooperating with said movable wall for biasing the same into engagement with the second end portion of said valve element to close said exhaust passage, said spring means urging said wall and said valve element in a direction to move said first end portion away from said first passage in response to a decrease in pressure at said outlet port, an increase in pressure at said outlet port urging said movable wall away from said second end portion to open said exhaust passage.

12. A pressure regulator comprising, in combination, a housing having an inlet chamber, an intermediate chamber and an exhaust chamber, a stationary valve member of metallic material supported within said housing between said inlet chamber and said intermediate chamber, said valve member including a first passage interconnecting said inlet chamber and said intermediate chamber and a second passage in open communication with said first passage, means including a movable wall within said housing between said intermediate chamber and said exhaust chamber, said last-mentioned means having a metallic valve seat carried by said wall and an exhaust passage therein interconnecting said intermediate chamber and said exhaust chamber, means defining an inlet port supplied with fluid under pressure and comunicating with said inlet chamber, means defining an outlet port in open communication with the second passage of said valve member and with said intermediate chamber, an elongated, integrally formed valve element of plastic material movably carried by said valve member and including a first end portion thereadjacent for closing said first passage and a second end portion adjacent said seat for closing said exhaust passage, and spring means cooperating with said movable wall for biasing said valve seat into engagement with the second end portion of said valve element to close said exhaust passage, said spring means urging said wall and said valve element in a direction to move said first end portion away from said first passage in response to a decrease in pressure at said outlet port, an increase in pressure at said outlet port urging said movable wall and said seat away from said second end portion against the bias exerted on said seat by said spring means to open said exhaust passage.

13. A pressure regulator comprising, in combination, a housing having an inlet chamber, an intermediate chamber and an exhaust chamber, a valve member of metallic material supported within said housing between said inlet chamber and said intermediate chamber, said valve member including a first passage interconnecting said inlet chamber and said intermediate chamber and a second passage in open communication with said first passage, means including a movable wall within said housing between said intermediate chamber and said exhaust chamber, said last-mentioned means having an exhaust passage interconnecting said intermediate chamber and said exhaust chamber, means defining an inlet port supplied with fluid under pressure and communicating with said inlet chamber, means defining an outlet port in open communication with the second passage of said valve member and with said intermediate chamber, an elongated integrally formed valve element of plastic material reciprocally carried by said valve member and including a first end portion for closing said first passage and a second end portion for closing said exhaust passage, first spring means cooperating with said valve element for biasing the first end portion thereof into engagement with said valve member to close said first passage, and second spring means cooperating with said movable wall for biasing the same into engagement with said second end portion to close said exhaust passage, said second spring means urging said wall and said valve element in a direction to move said first end portion away from said first passage in response to a decrease in pressure at said outlet port, an increase in pressure at said outlet port urging said movable wall away from said second end portion to open said exhaust passage and enable said first spring means to close said first passage.

14. A pressure regulator comprising, in combination, a housing having an inlet chamber, an intermediate chamber and an exhaust chamber, a valve member of metallic material supported within said housing between said inlet chamber and said intermediate chamber, said valve member including a first passage interconnecting said inlet chamber and said intermediate chamber and a second passage in open communication with said first pssage, means including a movable wall within said housing between said intermediate chamber and said exhaust chamber, said last-mentioned means having a metallic valve seat and an exhaust passage therein interconnecting said intermediate chamber and said exhaust chamber, means defining an inlet port supplied with fluid under pressure and communicating with said inlet chamber, means defining an outlet port in open communication with the second passage of said valve member and with said intermediate chamber, an elongated, integrally formed valve element of plastic material movably mounted in the first passage of said valve member, one of said end portions being engageable with said valve member for closing said first passage, the other end portion being engageable with said valve seat for closing said exhaust passage, said valve element blocking communication through said first passage between said inlet chamber and said intermediate chamber for all positions thereof, first spring means cooperating with said valve element for biasing said one end portion into engagement with said valve member to close said first passage, and second spring means cooperating with said movable wall for biasing the same into engagement with said other end portion to close said exhaust passage, said second spring means urging said wall and said valve element in a direction to move said one end portion away from said first passage in response to a decrease in pressure at said outlet port, an increase in pressure at said outlet port urging said movable wall away from said other end portion to open said exhaust passage and enable said first spring means to close said first passage.

15. A pressure regulator of the character set forth in claim 14, in which said second spring means comprises an elongated coil spring, and means for varying the tension in said spring, to thereby vary the bias on said movable wall.

16. A pressure regulator comprising, in combination, a housing having an inlet chamber, an intermediate chamber and an exhaust chamber, a stationary valve member of metallic material supported within said housing between said inlet chamber and said intermediate chamber, said valve member including a first passage interconnecting said inlet chamber and said intermediate chamber and a second passage in open communication with said first passage, means including a flexible wall within said housing between said intermediate chamber and said exhaust chamber, said last-mentioned means having a metallic valve seat carried by said wall and an exhaust passage therein interconnecting said intermediate chamber and said exhaust chamber, means defining an inlet port supplied with fluid under pressure and communicating with said inlet chamber, means defining an outlet port in open communication with the second passage of said valve member and with said intermediate chamber, an elongated integrally formed valve element of plastic material reciprocally mounted in the first passage of said valve member and including a first end portion engageable therewith for closing said first passage and a second end portion engageable with said valve seat for closing said exhaust passage, said valve element blocking communication through said first passage between said inlet chamber and said intermediate chamber for all positions thereof, means including a first coil spring cooperating with said valve element for biasing the first end portion thereof into engagement with said valve member to close said first passage, and means including a second coil spring cooperating with said wall for biasing the valve seat carried thereby into engagement with said second end portion to close said exhaust passage, said second spring urging said wall and said valve element in a direction to maintain said exhaust passage closed and to move said first end portion away from said first passage in response to a decrease in pressure at said outlet port, an increase in pressure at said outlet port urging said movable wall and said seat away from the second end portion of said valve element to open said exhaust passage and enable said first spring to close said first passage.

17. A pressure regulator of the character set forth in claim 16, in which said valve member forms a portion of said housing, said inlet port and said outlet port being located in said valve member in coaxial alignment with each other.

References Cited by the Examiner
UNITED STATES PATENTS

| | | | |
|---|---|---|---|
| 2,664,674 | 1/1954 | Niesemann | 137—116.5 |
| 2,707,966 | 5/1955 | Taplin | 137—116.5 |
| 2,761,464 | 9/1956 | Faust | 137—116.5 |
| 2,891,784 | 6/1959 | Taylor | 137—116.5 |
| 2,981,280 | 4/1961 | Cornelius | 137—116.5 |
| 2,998,021 | 8/1961 | Becker | 137—116.5 |
| 3,059,892 | 10/1962 | Windsor | 251—368 XR |
| 3,072,135 | 1/1963 | Moskow | 137—116.5 |
| 3,086,548 | 3/1963 | Galiger | 137—116.5 XR |

ISADOR WEIL, *Primary Examiner.*

CLARENCE R. GORDON, *Examiner.*